United States Patent
Yamashita et al.

(10) Patent No.: US 6,745,533 B2
(45) Date of Patent: Jun. 8, 2004

(54) BUILDING AND CONSTRUCTION METHOD THEREFOR

(75) Inventors: Toshio Yamashita, Hiratsuka (JP); Yoshimasa Tsuchiya, Tokyo (JP); Kazuyuki Nakamura, Futaba-gun (JP); Kiyoshi Nakamura, Funabashi (JP); Kenji Sekiguchi, Tokyo (JP); Hiroshi Murakami, Yokohama (JP); Nobuaki Miura, Tokyo (JP); Isao Kojima, Tokyo (JP); Sadao Suzuki, Tokyo (JP); Yasuyoshi Shimazaki, Tokyo (JP); Yoichiro Takeuchi, Kitasouma-gun (JP); Fumio Fujita, Sakura (JP)

(73) Assignees: Tokyo Electric Power Company, Inc., Tokyo (JP); Shimizu Construction Co., Ltd., Tokyo (JP)

( * ) Notice: Subject to any disclaimer, the term of this patent is extended or adjusted under 35 U.S.C. 154(b) by 27 days.

(21) Appl. No.: 10/202,139

(22) Filed: Jul. 24, 2002

(65) Prior Publication Data

US 2003/0024202 A1 Feb. 6, 2003

(30) Foreign Application Priority Data

Jul. 31, 2001 (JP) ....... 2001-232424
Jul. 31, 2001 (JP) ....... 2001-232425
Jul. 31, 2001 (JP) ....... 2001-232426

(51) Int. Cl.[7] .............................. G21C 15/18
(52) U.S. Cl. .................. 52/425; 52/236.5; 52/236.3
(58) Field of Search ............. 52/425, 414, 236.5, 52/79.1, 236.3, 167.3; 376/293, 282, 283

(56) References Cited

U.S. PATENT DOCUMENTS

| | | | | |
|---|---|---|---|---|
| 2,918,176 A | * | 12/1959 | Bell et al. | 211/191 |
| 3,827,205 A | * | 8/1974 | Barbera | 52/426 |
| 5,011,652 A | * | 4/1991 | Tominaga et al. | 376/283 |
| 5,412,913 A | * | 5/1995 | Daniels et al. | 52/79.13 |
| 6,009,674 A | * | 1/2000 | Root | 52/167.3 |
| 6,167,671 B1 | * | 1/2001 | Wilson | 52/654.1 |
| 6,173,027 B1 | * | 1/2001 | Saito et al. | 376/283 |

FOREIGN PATENT DOCUMENTS

| | | |
|---|---|---|
| JP | 62-170640 | 7/1987 |
| JP | 3-176537 | 7/1991 |
| JP | 4-2147 | 1/1992 |
| JP | 7-46152 | 5/1995 |
| JP | 7-46153 | 5/1995 |
| JP | 7-46154 | 5/1995 |
| JP | 2594002 | 2/1999 |
| JP | 2000-338284 | 12/2000 |

OTHER PUBLICATIONS

Japanese Patent Application No. 6–92676, dated Nov. 16, 1994, together with an English–Language Abstract, corresponding to Japanese patent application No. 01–244039, dated Sep. 28, 1989.

Japanese Patent Application No. 2881254, dated Feb. 5, 1999, together with an English–Language Abstract, corresponding to Japanese Patent Application No. 4–044576, dated Feb. 14, 1992.

* cited by examiner

Primary Examiner—Carl D. Friedman
Assistant Examiner—Basil Katcheves
(74) Attorney, Agent, or Firm—Scully, Scott, Murphy & Presser

(57) ABSTRACT

The present invention is provided for considerably shortening the construction time of a building that is applied to nuclear power plants. When constructing the building, megablocks having a height that extends to a plurality of floors are produced, and together with combining those megablocks, concrete is poured inside them to form a wall member composed of a megawall structure of steel plate reinforced concrete construction. Alternatively, in addition to the wall megablocks, floor megablocks for forming the floor member of the building are used, and together with combining those megablocks, concrete is poured inside or above them to form a structural member (wall member and floor member) composed of a megawall structure of steel plate reinforced concrete construction.

11 Claims, 10 Drawing Sheets

BUILDING AND CONSTRUCTION METHOD THEREFOR

BACKGROUND OF THE INVENTION

1. Field of the Invention

The present invention relates to a building suitable for application to a nuclear power plant, and more particularly, to a building structure and its construction method.

2. Description of the Related Art

Reinforced concrete (RC) construction, steel-framed reinforced concrete (SRC) construction or a combination of these two constructions are typically used for the structures of the reactor buildings and turbine buildings at nuclear power plants. However, since the buildings at this type of facility are required to have much higher levels of safety and reliability than in the case of ordinary structures, extremely rigid structures are required. Thus, since the wall and slab thicknesses are considerably thicker in comparison with ordinary buildings, and the amounts of iron and steel reinforcing members are much greater, construction costs are inevitably higher and the construction period is longer.

FIGS. 13 and 14 show an example of the design of this type of reactor building. This building consists of RC construction for the below ground portion and lower levels of the above ground portion, SRC construction for the upper levels, and steel frame (S) construction for the roof, and has a structure in which cylindrical containment vessel 2 is arranged in the center of the outer peripheral wall 1, the planar shape of which is nearly square, and columns 3, beams 4, slabs 5 on each floor and earthquake-resisting walls 6 are provided on multiple floors around its periphery. Reference symbol 7 indicates a foundation plate, 8 a pressure vessel, 9 its pedestal, 10 a diaphragm floor inside the containment vessel 2, 11 a top slab of the containment vessel 2, 12 a pool wall for providing pool P above containment vessel 2, 13 an operating floor, and 14 a roof truss. In addition, examples of the pool P include a spent fuel pool (SFP) and a dryer and separator storage pool (DSP).

This type of reactor building is constructed in the form of a wall member having a reinforced concrete construction in which the outer peripheral wall 1 has a thickness of about 0.3–2 meters, and the containment vessel 2 has a thickness of 2 meters. In addition, various types of numerous equipment and apparatuses are installed on each floor inside the building constructed in this manner. When constructing such a reactor building having this large size as well as complex structure and form, a construction period is required that is roughly twice as long as thermoelectric power plants of the same size. In particular, since the structural member of each floor and the structural member of the pool P and so forth are integrally provided around and above the containment vessel 2, its form becomes complex and the conditions under which stress is generated also become complex. As a result, construction is extremely difficult and intricate.

In contrast, there has been a request in recent years to shorten construction time during the construction of nuclear power plants, and various structures and construction methods have been developed in order to realize this. However, an effective structure and construction method that is able to realize a significant shortening of construction time have yet to be developed.

In consideration of the above circumstances, the object of the present invention is to provide a building and its construction method that are particularly suitable for nuclear power plants and so forth, and which are capable of realizing a significant shortening of construction time at the time of their construction.

SUMMARY OF THE INVENTION

The present invention relates to a building used for a nuclear power plant and characterized in that a wall portion which forms at least apart of the building is formed from a megawall structure of steel plate reinforced concrete construction that is composed by pouring concrete into megablocks composed of outer shell steel plates having a height equivalent to the plurality of floors of the building.

For example, a wall member which forms an outer peripheral wall of the building is formed from the megawall structure of steel plate reinforced concrete construction that is composed by pouring concrete into megablocks composed of outer shell steel plates having a height equivalent to the plurality of floors of the building.

According to this building, since the wall member is formed from the megawall structure of steel plate reinforced concrete construction, the ease of construction can be considerably improved as compared with reinforced concrete construction and steel-frame reinforced concrete construction of the prior art, and the form of the structural member can be simplified and abbreviated. As a result, construction time can be shortened considerably.

Alternatively, in the present invention, a structural member which is composed of the wall member and a floor member of the building is formed from the megawall structure of steel plate reinforced concrete construction composed by combining megablocks composed of outer shell steel plates having a height equivalent to the plurality of floors of the building for forming the wall member and megablocks composed of outer shell steel plates for forming the floor member, and by pouring concrete therein or there above.

According to this building, in addition to the megablocks for the wall member, since megablocks are also used for forming the floor member, and the structural member composed of the megawall structure of steel plate reinforced concrete construction is formed by combining these megablocks, the ease of construction is further improved, thereby making it possible to further shorten construction time.

In case of construction of the building, the megablocks composed of outer shell steel plates having a height equivalent to the plurality of floors of the building are produced in advance followed by forming an outer shell of the wall member using these megablocks, and then the wall member composed of the megawall structure of steel plate reinforced concrete construction is formed by pouring concrete into the above megablocks.

Alternatively, in case of construction of the building, the megablocks composed of outer shell steel plates having a height equivalent to the plurality of floors of the building for forming the wall member of the building, and megablocks composed of outer shell steel plates for forming the floor member of the building, are produced in advance followed by forming an outer shell of the structural member by combining these megablocks, and then the structural member composed of the megawall structure of steel plate reinforced concrete construction is formed by pouring concrete into and above these megablocks.

According to these methods, the wall member or structural member composed of a megawall structure of steel plate reinforced concrete construction is formed simply by forming outer shell of a wall member or structural member by assembling megablocks produced in advance followed by pouring concrete. Thus, the building can be constructed extremely efficiently, and the construction time can be shortened considerably.

Furthermore, an equipment module may be provided inside the building. This equipment modules is composed of steel frames formed by support columns that have a height equivalent to the plurality of floors and function as columns inside the building and floor frames that are supported by the support columns and function as floors in the building, and various types of equipment to be installed in the building that are provided in the steel flames along with their ancillary piping.

According to this building, construction of the columns and floors of the building as well as installation of equipment can be carried out collectively simply by installing the equipment module in the building. Thus, the building can be constructed extremely efficiently and the construction time required for constructing the building and installing equipment can be shortened considerably.

In this case, the equipment module preferably being self-standing in the above building, and the horizontal force that acts on the equipment module is preferably supported by the structural member of the building which surrounding the equipment module.

According to this building, since a structure is employed in which the horizontal force that acts on the self-standing equipment module is supported by the surrounding structural member, it is not necessary to give horizontal bearing force to the equipment module themselves. Thus, the steel frames only require a simple, lightweight structure.

In this case, it is preferable that the structural member surrounding the equipment modules is composed of the megawall structure of steel plate reinforced concrete construction that is composed by pouring and filling concrete into megablocks composed of outer shell steel plates.

When the building is a reactor building provided with a pool above a containment vessel, a peripheral wall of the containment vessel is extending upward to form a pool outer peripheral wall that has a cylindrical shape when viewed from overhead, and a pool inner peripheral wall is provided on a top slab of the containment vessel so as to be concentric with the pool outer peripheral wall, and as a result, a ring-shaped pool employing the top slab for its bottom is integrally provided with the containment vessel.

According to this building, since the ring-shaped pool is integrally provided with the containment vessel above the containment vessel, the form of the structural member above the containment vessel can be simplified considerably as compared with reactor buildings of the prior art. Thus, the ease of construction is improved significantly, and construction time can be shortened considerably. Moreover, since the upper structure of the containment vessel is simplified, the status of stress generation in that section is improved and the pool has the effect of reinforcing the containment vessel, thereby allowing the obtaining of favorable results in terms of structure as well.

In this case, it is preferable that the containment vessel and pool are composed of a megawall structure of steel plate reinforced concrete construction that is composed by pouring and filling concrete into megablocks composed of outer shell steel plates.

According to this building, since the formwork and work for providing reinforcing bars are omitted due to the use of steel plate reinforced concrete construction, the ease of construction can be improved considerably and construction time can be shortened considerably.

In addition, the containment vessel and pool outer peripheral wall are preferably separated from the peripheral structural member and made to stand alone.

According to this building, by isolating the containment vessel and pool outer peripheral wall from the surrounding structural member and allowing them to stand alone, it is no longer necessary to join the two structural members, and work for providing the two structural members can be carried out independently. As a result, a rational process can be compiled during building construction, thereby making it possible to shorten construction time even more.

DETAILED DESCRIPTION OF THE PREFERRED EMBODIMENT

Figure 1:
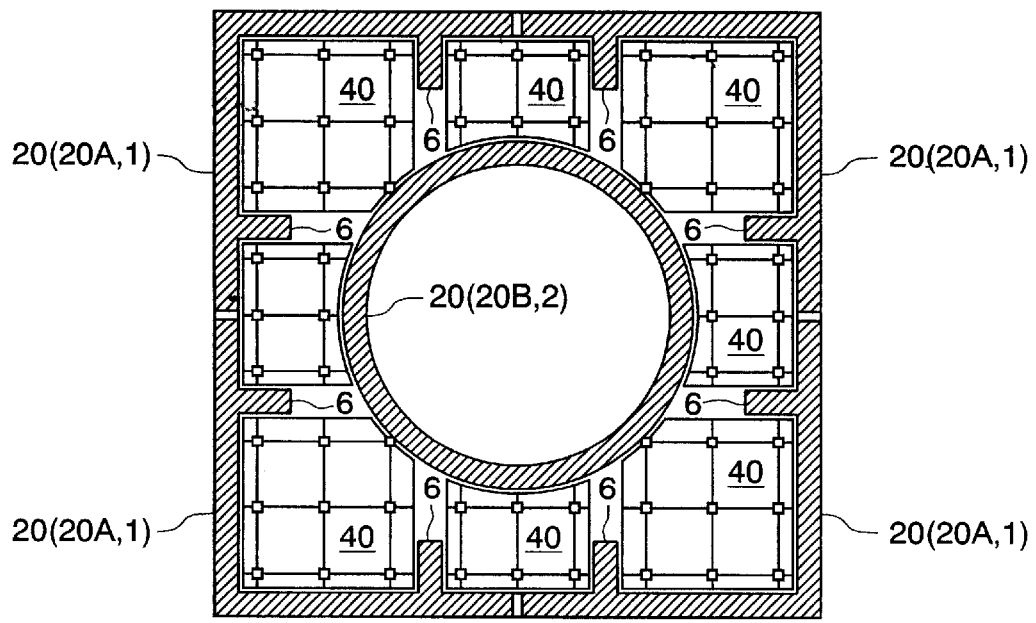
FIG. 1 is an overhead view showing a reactor building as an embodiment for carrying out the present invention.
Figure 2:
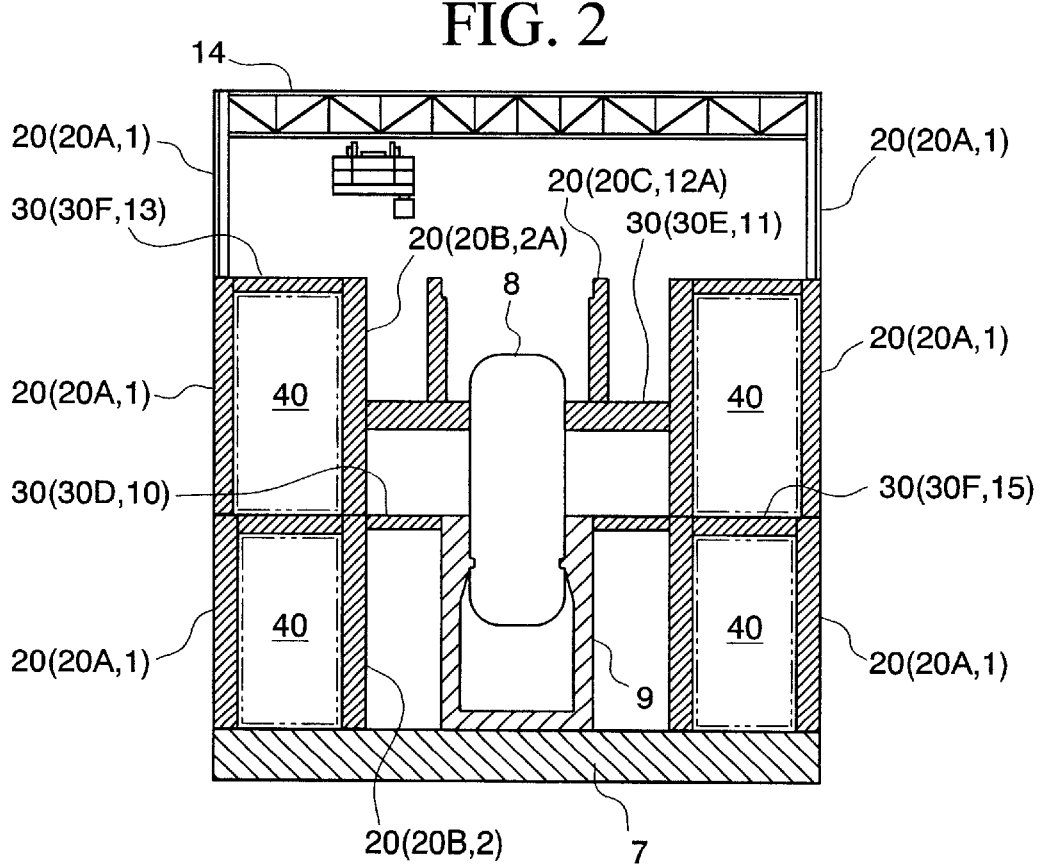
FIG. 2 is a cross-sectional view of the reactor building of FIG. 1.
Figure 3:
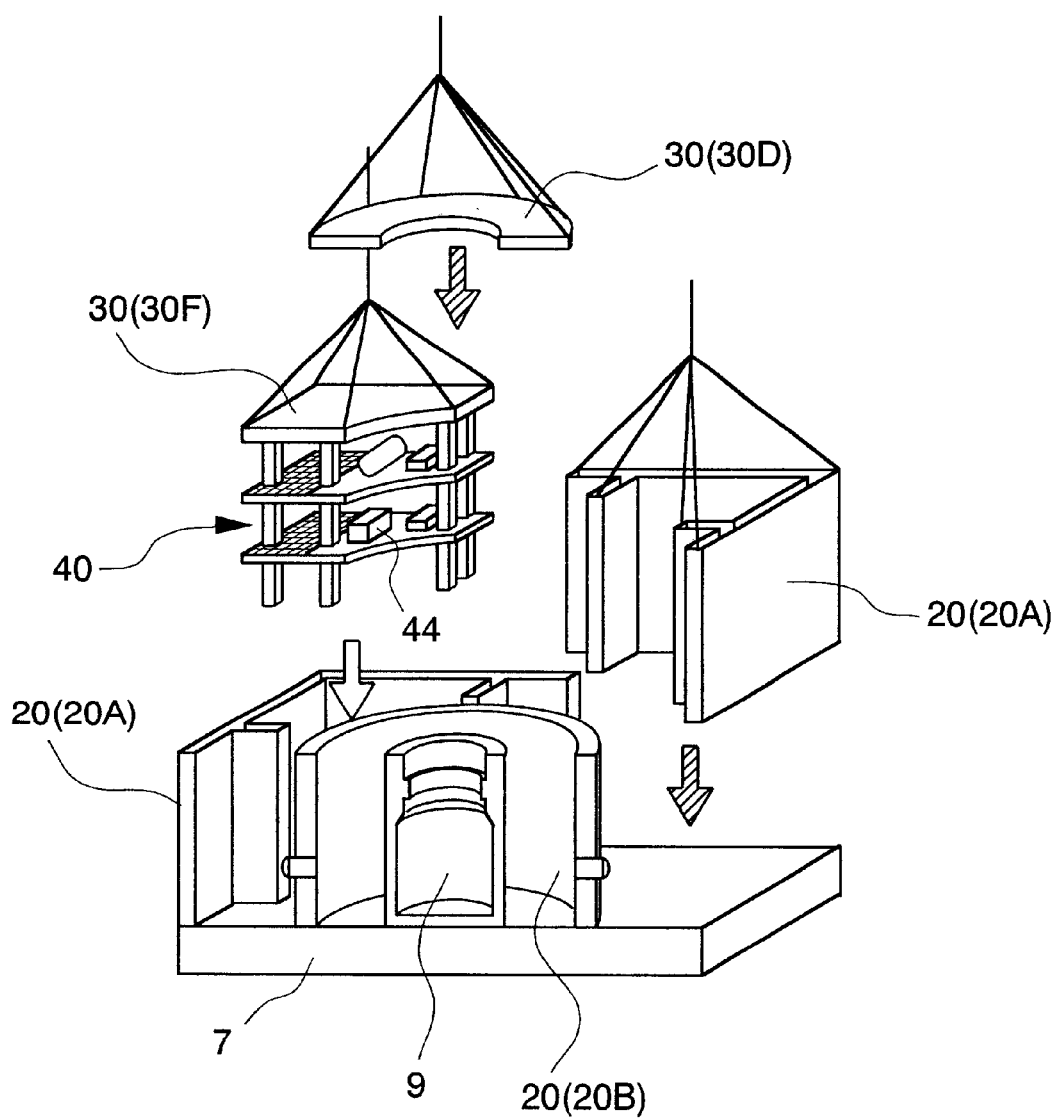
FIG. 3 is a drawing showing a summary of the assembly state of the reactor building of FIG. 1.
Figure 13:
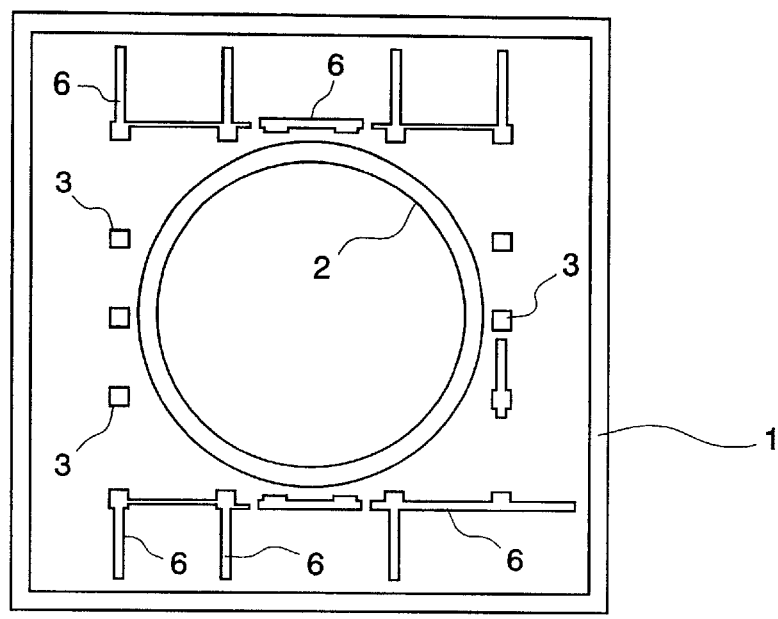
FIG. 13 is an overhead view showing an example of a reactor building of the prior art.
Figure 14:
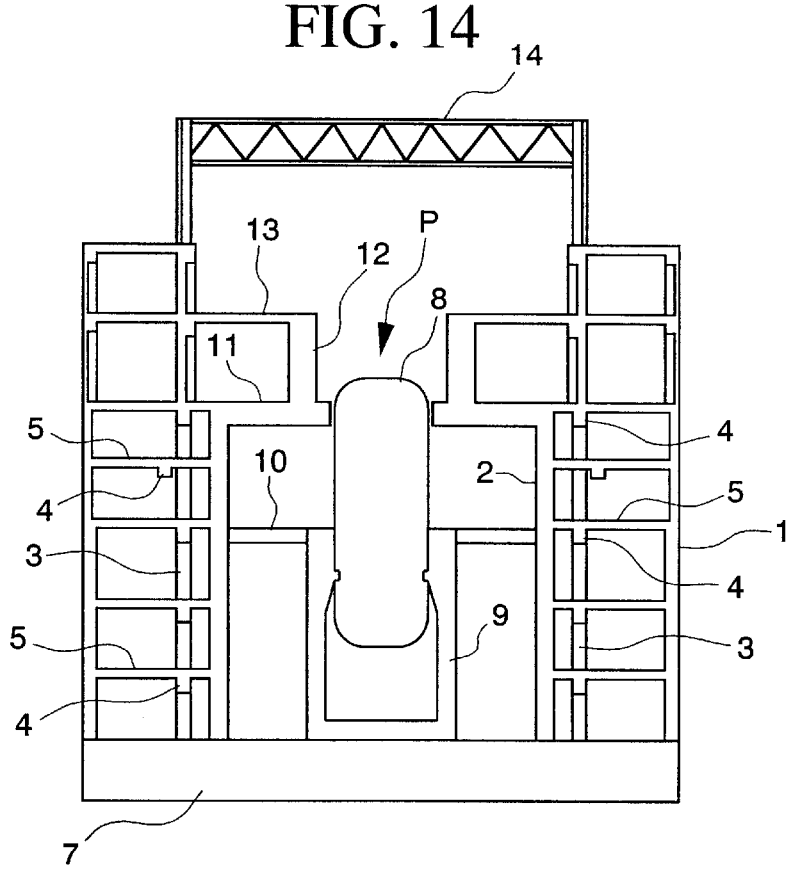
FIG. 14 is a cross-sectional view of the reactor building of FIG. 13.

The following provides an explanation of an embodiment for carrying out the present invention with reference to FIGS. 1 through 8. This embodiment is provided for carrying out the present invention to a reactor building of steel plate reinforced concrete construction. Although this reactor building is provided with a cylindrical containment vessel 2 concentric to outer peripheral wall 1 having a nearly square shape when viewed overhead in the same manner as the reactor building of the prior art as shown in FIGS. 13 and 14, in contrast to the prior art employing a construction method in which the containment vessel 2 of RC construction and its surrounding multiple floors of structural members are sequentially constructed from the lower floor followed by sequentially installing equipment on each floor, in the present embodiment for carrying out the invention, as shown conceptually in FIG. 2, large-scale wall megablocks 20 (consisting of three types, 20A, 20B and 20C, in the present embodiment for carrying out the invention) and similar large-scale floor megablocks 30 (also consisting of three types, 30D, 30E and 30F, in the present embodiment for carrying out the invention) are employed, and by then assembling these by coupling together and pouring in concrete as shown in FIG. 3, a rigid megawall structure is formed that serves as the main part of the structural member (consisting of outer peripheral wall 1, containment vessel 2, pool outer peripheral wall 2A, pool inner peripheral wall 12A, diaphragm floor 10, top slab 11, intermediate floor 15 and operating floor 13), and by installing a large-scale equipment modules 40 therein, the work for installing equipment in the building can be carried out collectively. By surrounding the equipment modules 40 (left and right, above and below) with a megawall structure formed by the megablocks 20 and 30, the horizontal force that acts on the equipment modules 40 during occurrence of an earthquake is supported with this megawall structure.

Figure 4:
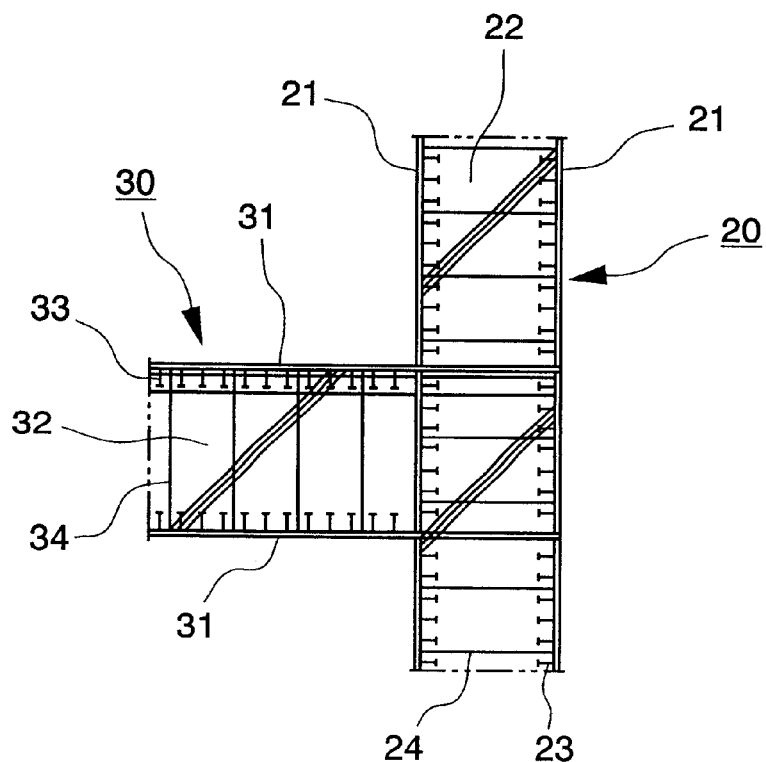
FIG. 4 is a partially enlarged cross-sectional view of a megawall structure of the reactor building of FIG. 1.

As shown in FIG. 4, the megablocks 20 for the wall that are employed in the present embodiment for carrying out the invention are hollow structures in which outer shell steel plates 21 that compose the outer shell of the wall member and also serve as forms are integrated in mutual opposition while securing a distance equivalent to the wall thickness, and after having been installed at their prescribed locations, by pouring concrete 22 therein, the outer shell steel plates 21 and concrete 22 are integrated by means of a large number of studs 23 and tie bars 24 provided inside, resulting in the formation of a rigid wall member of steel plate reinforced concrete construction.

Similarly, as also shown in FIG. 4, the megablocks 30 for the floor that are employed in the present embodiment for carrying out the invention are hollow structures in which outer shell steel plates 31 that compose the outer shell of the floor member (slab) and also serve as forms are integrated in mutual opposition while securing a distance equivalent to the thickness of the floor, and after having been installed at their prescribed locations, by pouring concrete 32 therein, outer shell steel plates 31 and concrete 32 are integrated by means of a large number of studs 33 and tie bars 34 provided inside, resulting in the formation of a slab of steel plate reinforced concrete construction. Furthermore, the outer shell steel plates 31 on the top side in the megablocks 30 may be substituted with reinforcing bars. In this case, the slab is formed by pouring concrete 32 to a prescribed thickness above the outer shell steel plates 31 on the bottom side.

By then mutually coupling the megablocks 20 and megablocks 30 and pouring concrete 22 and 32 inside or above, a megawall structure is formed that composes the main part of the structural member of the entire reactor building.

In the present embodiment for carrying out the invention, three types of megablocks, namely the megablocks 20A serving as the outer peripheral wall 1, the megablocks 20B serving as the peripheral wall of the containment vessel 2 and the pool outer peripheral wall 2A, and the megablocks 20C serving as the pool inner peripheral wall 12A, are used as the megablocks 20 which form the megawall structure for the wall. In addition, three types of megablocks are similarly used as the megablocks for the floor, namely the megablocks 30D serving as the diaphragm floor 10, the megablocks 30E serving as the top slab 11, and the megablocks 30F serving as the intermediate floor 15 and operating floor 13.

As, shown in FIGS. 1 and 2, megablocks 20A serving as the outer peripheral wall 1 have a form in which the outer peripheral wall 1 is divided into four equal parts in the peripheral direction, have a height that extends three floors, and earthquake-resisting walls 6 are integrally provided with the megablocks 20A in advance on the inside of the megablocks 20A. By stacking these megablocks 20A over two levels, three floors of the outer peripheral wall 1 from the bottom floor to the diaphragm floor 10, and three floors of the outer peripheral wall 1 from the diaphragm floor 10 to the operating floor 13 are constructed while simultaneously constructing the earthquake-resisting walls 6. By additionally stacking the megablocks 20A serving as the top outer peripheral wall 1 on top (the earthquake-resisting walls 6 are omitted) and laying a roof truss 14 on these megablocks 20A, the entire outer peripheral wall 1 and roof are constructed.

In addition, the containment vessel 2 and pool outer peripheral wall 2A are constructed by stacking two levels of the cylindrical megablocks 20B having a height equal to three floors inside the outer peripheral wall 1 constructed in the manner described above. The ring-shaped megablocks 30D serving as the diaphragm floor 10, the ring-shaped megablocks 30E serving as the top slab 11 and the cylindrical megablocks 20C serving as the pool inner peripheral wall 12A are then installed inside this containment vessel 2, and the megablocks 30F serving as the intermediate floor 15 and the operating floor 13 are installed outside the containment vessel 2 and pool outer peripheral wall 2A. As described above, by then coupling these megablocks 20 and 30 and pouring concrete 22 and 32 inside or above them, a megawall structure is formed that composes the majority of the structural member inside the building.

Figure 5:
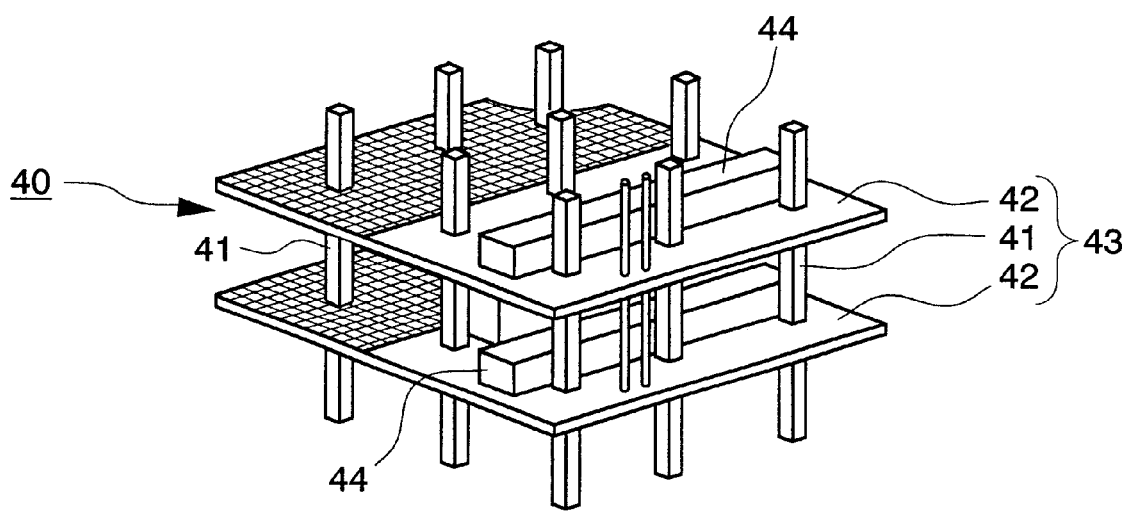
FIG. 5 is a drawing showing an embodiment of an equipment module housed in the reactor building of FIG. 1.

On the other hand, as shown in FIG. 5, the equipment modules 40 have various equipment 44 (for example, FPC pumps, CUW heat exchangers, RIP control panels) and their incidental pipes incorporated in advance on a steel frame 43 which has a height of three floors. The steel flame 43 is composed of six or nine support columns 41 made by steel frames and two floors of floor frames 42 made by steel materials. In the present embodiment for carrying out the invention, as shown in FIG. 1, by fabricating in advance equipment modules 40 having a height of three floors respectively corresponding to eight regions divided by each earthquake-resisting wall 6 on the outside of containment vessel 2, and installing those eight equipment modules 40, the equipment 44 and its pipes, which were individually installed on each floor either in parallel with construction of the structural member on each floor of the building or following completion of the structural member of each floor in the prior art, can be installed collectively.

Since the steel frame 43 itself in the above equipment modules 40 is equivalent to the internal columns 3 and two floors of beams 4 and slabs 5 in buildings of the prior art, it is not necessary to construct the internal columns 3, beams 4 or slabs 5 at the construction site. Thus, coupled with the use of each of the above megablocks 20 and 30, the structure of the building can be simplified considerably.

Furthermore, although the equipment modules 40 are made to stand alone in each building, as was stated above, a structure is employed in which the horizontal force that acts on the equipment modules 40 during the occurrence of an earthquake is supported by the surrounding megawall structure. According to this structure, the steel frame 43 is only required to be able to support its own weight along with the weight load of the equipment 44 (including their incidental pipes), and is not necessary to support the horizontal force. Thus, the support columns 41 may be narrow, and the floor frames 42 may be lightweight in the manner of steel mesh (so-called catwalk), for example, provided they enable the installation of each type of equipment 44 and allow the performing of maintenance work. Furthermore, if necessary in terms of installing the equipment 44, or in the case of requiring a shielding function, concrete should be poured at the required locations of the equipment modules 40. Pouring of concrete in this case may be performed during fabrication of the equipment modules 40 and prior to the installation of equipment, or may be performed at the site after installing the equipment modules 40 in the building.

The megablocks 20, megablocks 30 and equipment modules 40 explained above are fabricated at a yard in the vicinity of the construction site, and then installed by lifting with a crane. Thus, although their shapes and weights are determined in consideration of the conditions of the yard and capacity of the crane, when considering ease of construction, those which are as large as possible within the installable range are advantageous. In addition, their maximum weight is preferably from about 1000 to 1400 tons.

Figure 6:
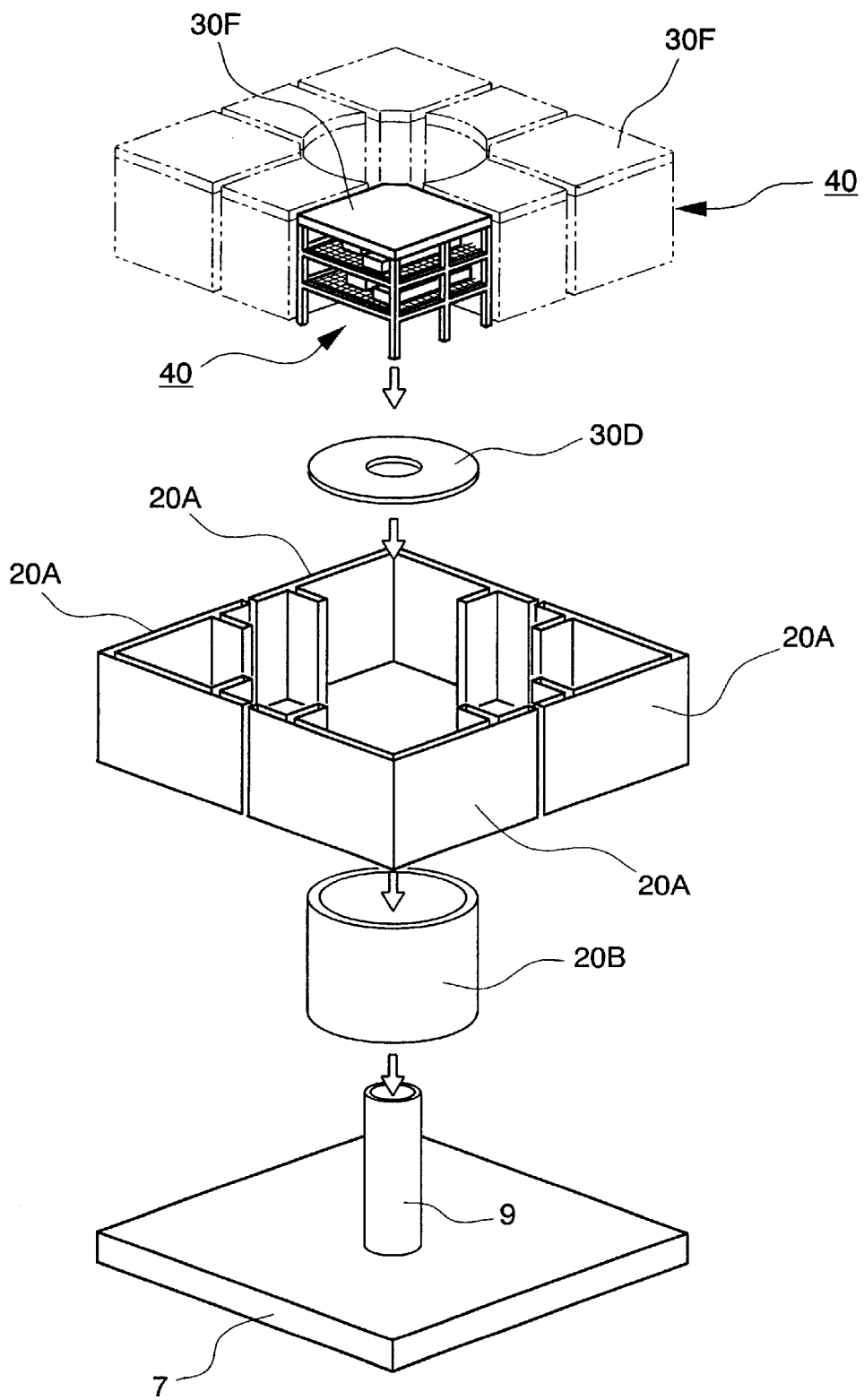
FIG. 6 is a drawing showing the assembly process of the first level of the reactor building of FIG. 1.
Figure 7:
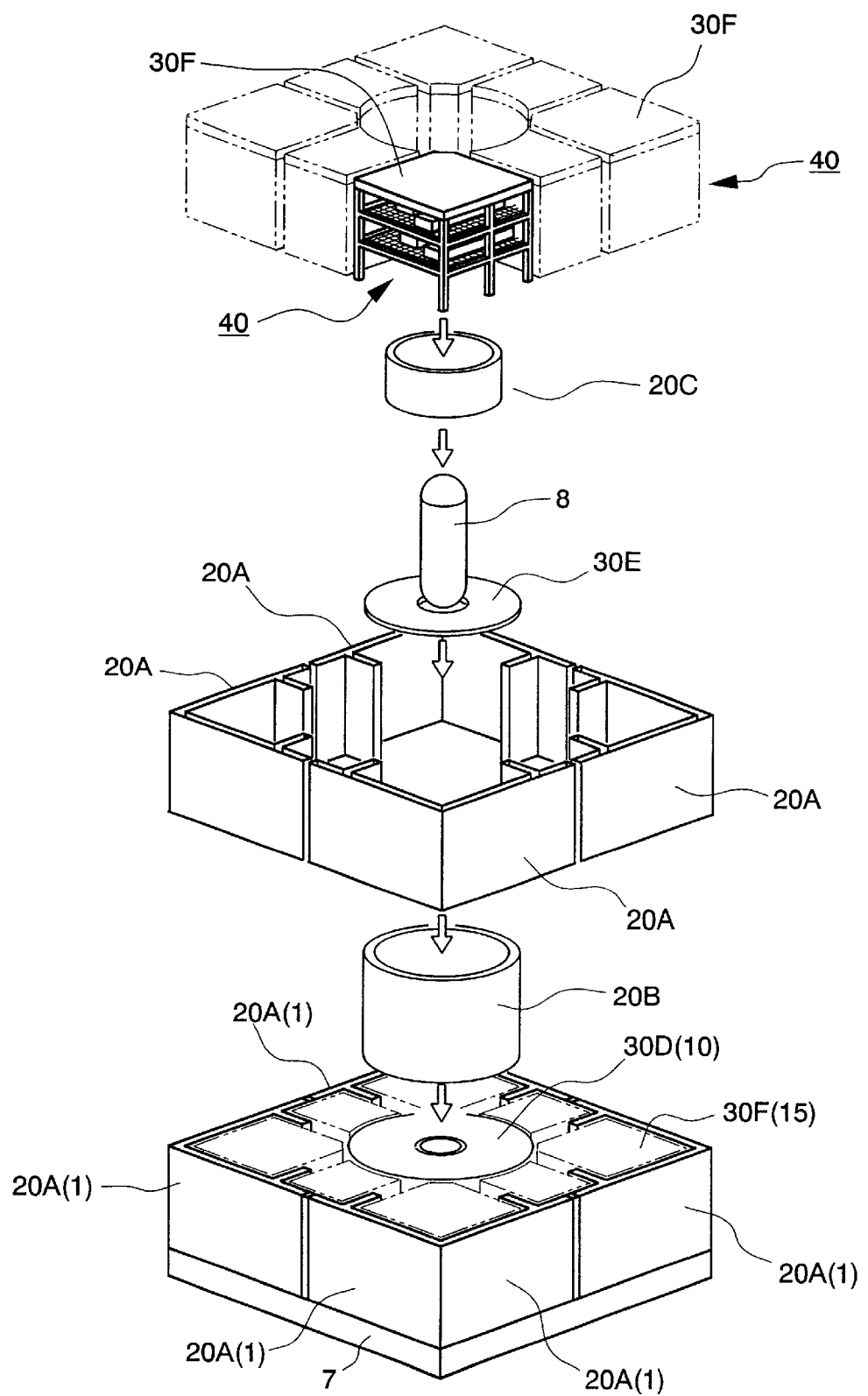
FIG. 7 is a drawing showing the assembly process of the second level of the reactor building of FIG. 1.
Figure 8:
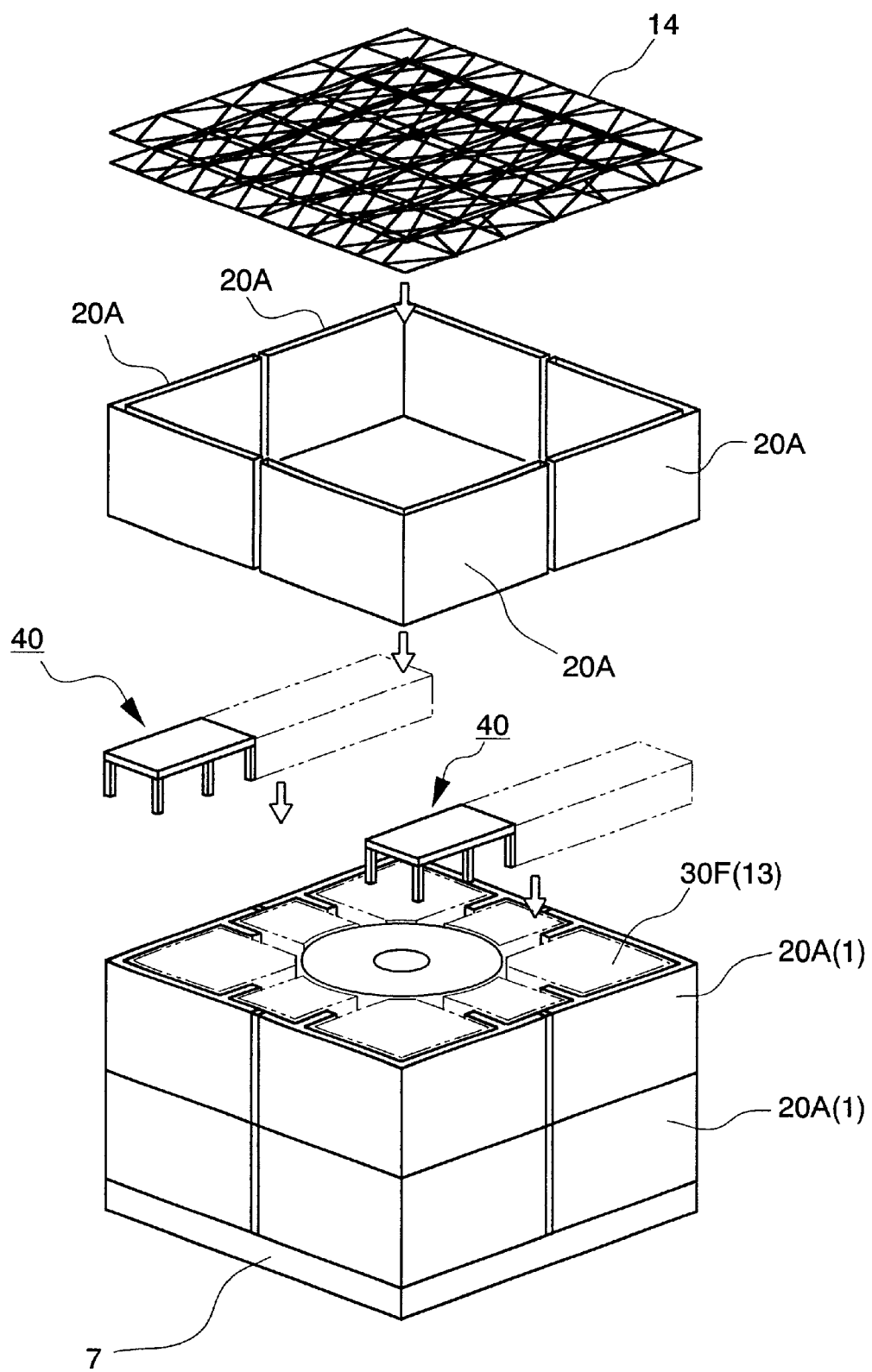
FIG. 8 is a drawing showing the assembly process of the third level of the reactor building of FIG. 1.

FIGS. 6 through 8 indicate the assembly process of a reactor building of the present embodiment for carrying out the invention. Prior to beginning construction of the building, fabrication of each megablock 30, megablock 20 and equipment module 40 is carried out in advance at the nearby work yard. Furthermore, as shown in FIG. 3, the megablocks 30F to serve as the intermediate floor 15 and operating floor 13 are integrally assembled in advance on the top of the equipment modules 40. When construction of a foundation plate 7 is completed, as shown in FIG. 6, together with installing a pedestal 9 of a pressure vessel 8, the megablock 20B to serve as the lower half of the peripheral wall of the containment vessel 2 is installed around them. Four megablocks 20A to serve as the outer peripheral wall 1 are then installed around the megablock 20B, and after installing various equipment and their incidental pipes (not shown) on the foundation plate 7 inside, eight equipment modules 40 are installed together with the megablocks 30F. Next, the megablock 30D to serve as the diaphragm floor 10 is installed, and after coupling each corresponding megablocks 20 and 30, concrete is poured to mutually join them and form the first level of the megawall structure. Joining of the corresponding megablocks 20 or joining of the megablocks 20 and 30 should be carried out either by directly welding the corresponding outer shell steel plates 21 and 31 or by forming a structural member of a structure that allows transfer of stress by arranging reinforcing bars between them.

Next, as shown in FIG. 7, the megablock 20B to serve as the pool outer peripheral wall 2A, four megablocks 20A to serve as the second level outer peripheral wall 1, the pressure vessel 8, the megablock 30E to serve as the top slab 11, and the megablock 20C to serve as the pool inner peripheral wall 12A are installed. After then installing various equipment and incidental pipes (not shown) on the intermediate floors 15, eight equipment modules 40 are installed together with the megablocks 30F that serve as the operating floors 13. In addition, by coupling each corresponding megablocks 20 and 30 and pouring concrete in the same manner as described above, the second level megawall structure is formed. Furthermore, as shown in FIG. 8, after installing four megablocks 20A to serve as the third level of the outer peripheral wall 1, and installing various equipment and their incidental pipes (not shown) on the operating floors 13 inside, four equipment modules 40 having a height equivalent to one floor are installed. After then installing equipment (not shown) on these equipment modules 40, concrete is poured to form the third level megawall structure followed by laying of a roof truss 14.

The majority of the work for the building construction and equipment installation are completed by the above procedure. In this case, the installation process of the megablocks 20 and 30, the coupling process of those corresponding megablocks 20 and 30, the concrete pouring process for them, and the installation process of the equipment modules 40 can be altered arbitrarily, and the construction should be performed by suitably changing the order of these processes or performing them in parallel as is suitable. For example, the megawall structure which provides the wall member may naturally first be formed by pouring concrete inside when the megablocks 20 for the wall member have been installed and coupled, and then the megawall structure which provides the floor member may be formed by pouring concrete after installing the megablocks 30 for the floor and coupling them.

According to the present embodiment for carrying out the invention, since large megablocks 20 and 30 of a form that divides the structural member of the building into large pieces, and large-scale equipment modules 40 of a height that covers multiple floors, are fabricated in advance, the majority of the work for constructing the structural member and installing equipment is completed simply by assembling them at the construction site. Thus, in comparison with the structures and construction methods of the prior art for which work consisted primarily of that at the construction site, construction can be carried out much more efficiently, and the construction time can be shortened considerably. Moreover, since simplification and abbreviation of the shape of the structural member is realized by using these megablocks 20 and 30 along with the equipment modules 40, the ease of construction is significantly improved and the effect of reducing construction costs is obtained due to this point as well.

Figure 9:
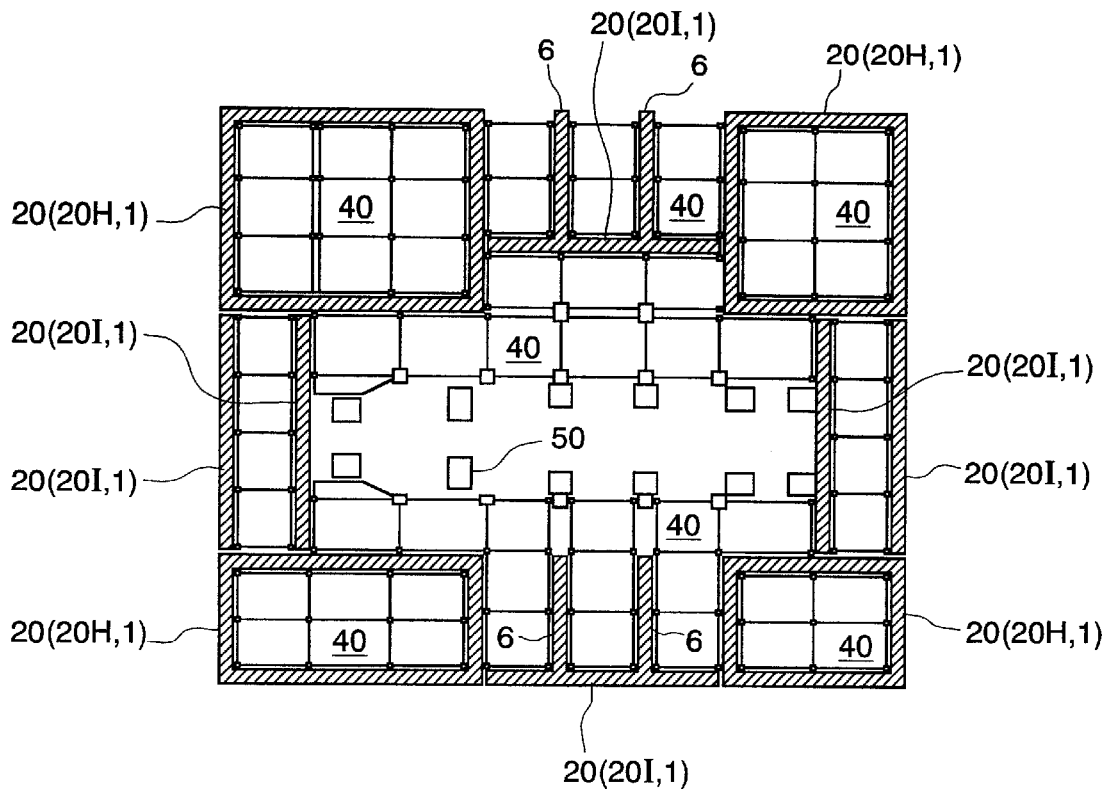
FIG. 9 is an overhead view showing a turbine building as an another embodiment for carrying out the present invention.
Figure 10:
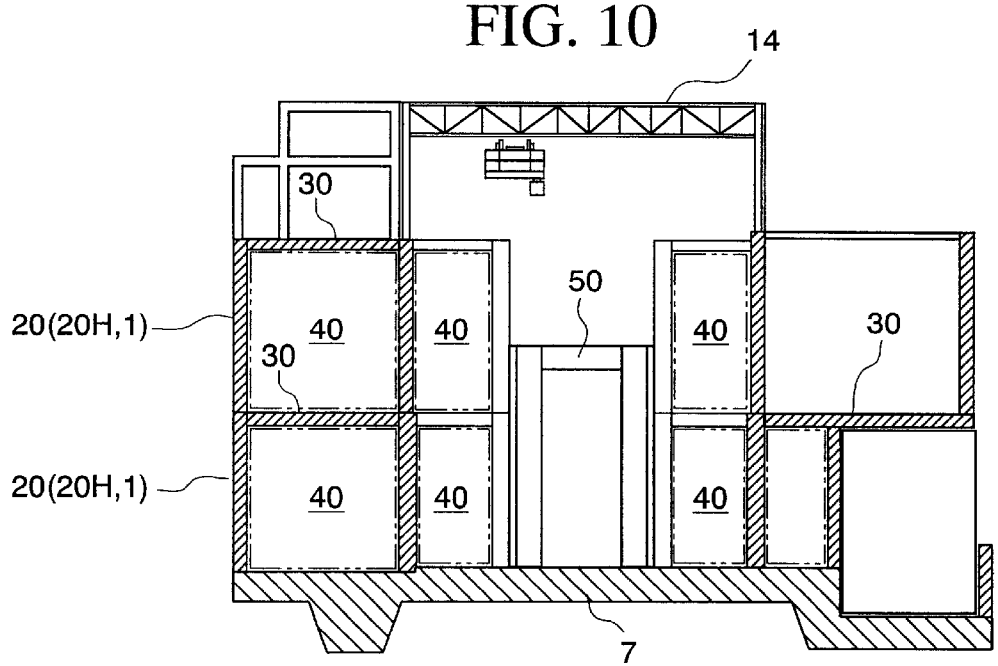
FIG. 10 is a cross-sectional view of the turbine building of FIG. 9.
Figure 11:
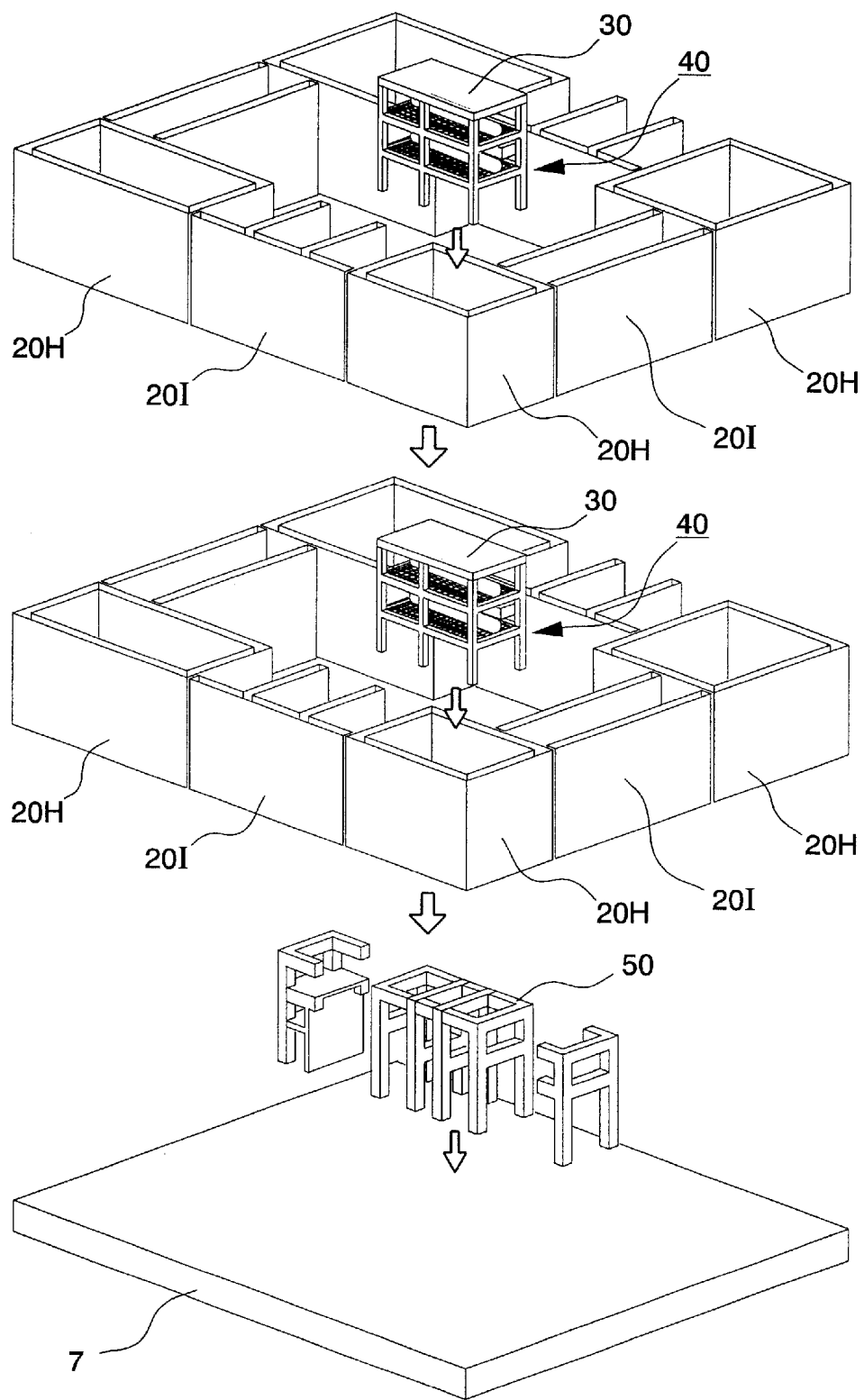
FIG. 11 is a drawing showing the assembly process of the turbine building of FIG. 9.

FIGS. 9 through 11 indicate an embodiment for carrying out the invention in the case of applying the present invention to the turbine building of the nuclear power plant. In the present embodiment for carrying out the invention as well, as a result of combining the megablocks 20 for the wall, having a height that extends over multiple floors, and the megablocks 30 for the floor to form the majority of the structural member with a megawall structure, and arranging the equipment modules 40 of a height that extends over multiple floors therein, similar to the reactor building of the above-mentioned embodiment for carrying out the invention, construction time is shortened considerably and the shape of the structural member is simplified. Furthermore, reference symbol 50 represents a turbine pedestal.

In addition, in the embodiment shown in the drawings, box-shaped megablocks 20H are arranged at the four corners of the building, and although these are connected with wall-shaped megablocks 20I and earthquake-resisting walls 6 are provided in the wall-shaped megablocks 20I as necessary, in any case, the shape of megablocks 20 should be optimally determined according to the shape and size of the building to be constructed, and the shape of equipment modules 40 should be optimally determined accordingly.

Figure 12A:
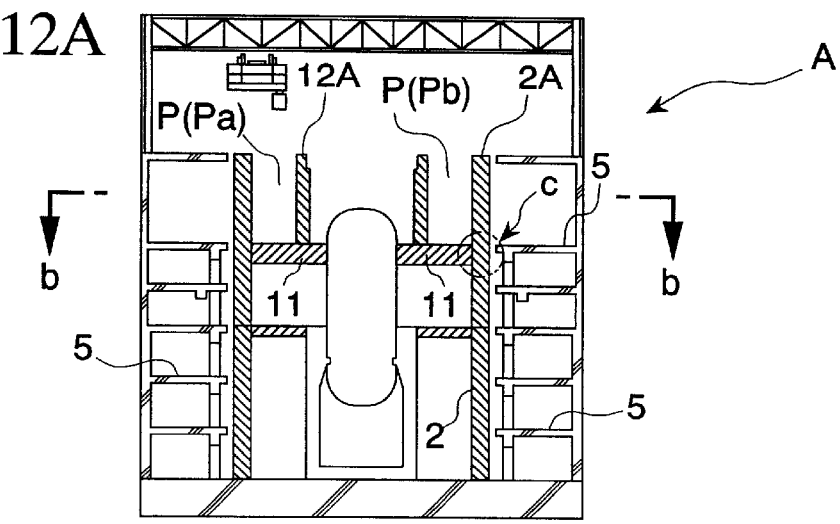
FIG. 12A is a cross-sectional view showing a reactor building as an another embodiment for carrying out the present invention.
Figure 12B:
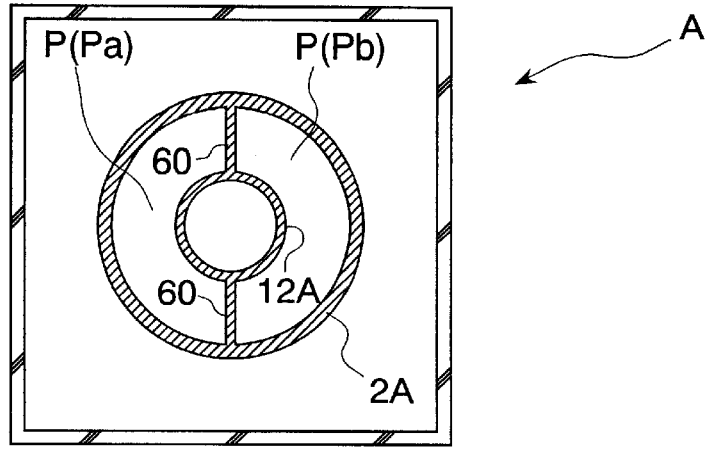
FIG. 12B is a cross-sectional view taken along line b—b in FIG. 12A.
Figure 12C:
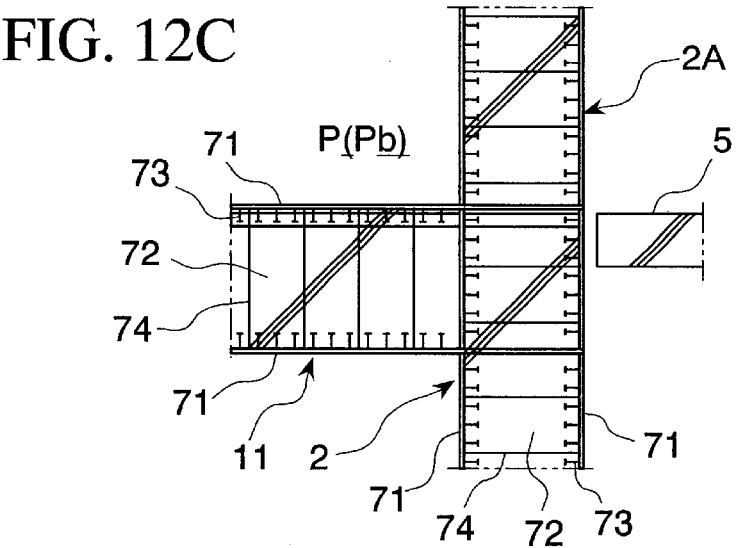
FIG. 12C is an enlarged cross-sectional view of section c in FIG. 12A.

Next, another embodiment for carrying out the present invention is explained with reference to FIGS. 12A through 12C. The present embodiment for carrying out the invention applies the present invention to a containment vessel 2 of the reactor building and a pool P which is provided thereon. In the reactor building A of the present embodiment for carrying out the invention, as a result of simply extending the peripheral wall of the containment vessel 2 upward, the pool outer peripheral wall 2A in the form of a circle when viewed overhead is formed on the top slab 11 of the containment vessel 2. In addition, by providing the pool inner peripheral wall 12A in the form of a circle when viewed overhead to be concentric with the pool outer peripheral wall 2A on the top slab 11, the ring-shaped pool P having the top slab 11 for its bottom is formed between the pool outer peripheral wall 2A and pool inner peripheral wall 12A, and as a result of being divided into two sections by partition wall 60, one section of the pool P is used as a spent fuel pool Pa and the other section of the pool P is used as a dryer and separator storage pool Pb. In addition, in the present embodiment for carrying out the invention, a steel plate reinforced concrete construction is used for the structures of containment vessel 2 and pool P. Namely, as shown in FIG. 12C, the peripheral wall of the containment vessel 2 and top slab 11, as well as the pool outer peripheral wall 2A, pool inner peripheral wall 12A and partition wall 60, which are integrally provided above them, all have a structure in which concrete 72 is filled into hollow outer shell steel plates 71 that also serve as forms, and outer shell steel plates 71 and concrete 72 are integrated by means of a plurality of studs 73 and tie bars 74 provided on the inner surface of the outer shell steel plates 71. Moreover, the peripheral wall of the containment vessel 2 and pool outer peripheral wall 2A stand alone separated from slabs 5.

As has been described above, by integrally providing the ring-shaped pool P with the containment vessel 2 above the containment vessel 2, the shape of the structural member in the upper portion of the containment vessel 2 is simplified considerably as compared with the prior art. Thus, ease of construction can be improved significantly, and construction time can be shortened considerably. In addition, if the shape of the upper portion of the containment vessel 2 is simplified, the state in which stress is generated becomes simpler and clearer. In addition, the pool outer peripheral wall 2A, pool inner peripheral wall 12A and partition wall 60 also serve to reinforce the peripheral wall of the containment vessel 2 and top slab 11, thereby also making this preferably structurally.

Moreover, as a result of steel plate reinforced concrete construction being used for the structures of the containment vessel 2 and pool P, the formwork and work for providing reinforcing bars can be omitted and construction time can be shortened while still ensuring structural strength, stability and reliability equal to or better than the case of using ordinary reinforced concrete construction. In addition, since a structural member having this steel plate reinforced concrete construction is allowed to independently stand alone separated from the peripheral structural member (slabs 5), it is not necessary for these corresponding structural members to be joined, and construction work for both structural members can be carried out independently. As a result, a rational process can be compiled during building construction, thereby allowing construction time to be shortened even more.

Furthermore, the gist of the present embodiment for carrying out the invention lies in the providing of a ring-shaped pool above a containment vessel and integrated with it, and the design can be suitably altered to another constitution provided this is still the case. For example, the constitution of the containment vessel and pool is not limited to the steel frame concrete construction as in the above embodiment for carrying out the invention, but rather another constitution may be used, and conversely, similar steel plate reinforced concrete construction may also be used for not only the containment vessel and pool, but also for other peripheral structural members. In the case of the latter in particular, the containment vessel need not be made to stand alone, but rather may be structurally integrally provided with other peripheral structural members.

What is claimed is:

1. A building used for a nuclear power plant, wherein a wall portion which forms at least a part of said building is formed from a megawall structure of steel plate reinforced concrete construction that is composed by pouring concrete into megablocks composed of outer shell steel plates having a height equivalent to the plurality of floors of said building, and wherein an equipment module which is composed of steel frames formed by support columns that have a height equivalent to the plurality of said floors and function as columns inside said building and floor frames that are supported by said support columns and function as floors in said building, and various types of equipment to be installed in said building that are previously provided in said steel frames along with their ancillary piping, is provided in the building.

2. A building according to claim 1, wherein said equipment module being self-standing in said building, and the horizontal force that acts on said equipment module is supported by a structural member of said building which surrounding said equipment module.

3. A building according to claim 2, wherein said structural member surrounding the equipment modules is composed of said megawall structure of steel plate reinforced concrete construction that is composed by pouring and filling concrete into said megablocks composed of said outer shell steel plates.

4. A building according to claim 1, wherein said wall portion is a wall member which forms an outer peripheral wall of said building.

5. A building used for a nuclear power plant, wherein a wall portion which forms at least a part of said building is formed from a megawall structure of steel plate reinforced concrete construction that is composed by pouring concrete into megablocks composed of outer shell steel plates having a height equivalent to the plurality of floors of said building, and wherein said building is a reactor building comprising a containment vessel and a ring-shaped pool that employs a top slab of said containment vessel for its bottom, and said pool is integrally provided with said containment vessel by extending a peripheral wall of said containment vessel upward to form a pool outer peripheral wall that has a cylindrical shape when viewed from overhead and by providing a pool inner peripheral wall on said top slab so as to be concentric with said pool outer peripheral wall.

6. A building according to claim 5, wherein said containment vessel and pool are composed of said megawall structure of steel plate reinforced concrete construction that is composed by pouring and filling concrete into said megablocks composed of said outer shell steel plates.

7. A building according to claim 5, wherein said containment vessel and pool outer peripheral wall are separated from a peripheral structural member and made to stand alone.

8. A building according to claim 6, wherein said containment vessel and pool outer peripheral wall are separated from a peripheral structural member and made to stand alone.

9. A building according to claim 5, wherein said wall portion is a wall member which forms an outer peripheral wall of said building.

10. A building according to claim 7, wherein said structural member surrounding the equipment modules is composed of said megawall structure of steel plate reinforced concrete construction that is composed by pouring and filling concrete into said megablocks composed of said outer shell steel plates.

11. A building according to claim 8, wherein said structural member surrounding the equipment modules is composed of said megawall structure of steel plate reinforced concrete construction that is composed by pouring and filling concrete into said megablocks composed of said outer shell steel plates.

\* \* \* \* \*